United States Patent
Fang

(10) Patent No.: US 12,229,233 B2
(45) Date of Patent: Feb. 18, 2025

(54) DEVICE CONTROL METHOD AND SYSTEM

(71) Applicant: Chao Fang, Hangzhou (CN)

(72) Inventor: Chao Fang, Hangzhou (CN)

( * ) Notice: Subject to any disclaimer, the term of this patent is extended or adjusted under 35 U.S.C. 154(b) by 871 days.

(21) Appl. No.: 17/053,803

(22) PCT Filed: May 9, 2018

(86) PCT No.: PCT/CN2018/086104
§ 371 (c)(1),
(2) Date: Nov. 9, 2020

(87) PCT Pub. No.: WO2019/213855
PCT Pub. Date: Nov. 14, 2019

(65) Prior Publication Data
US 2021/0224368 A1 Jul. 22, 2021

(51) Int. Cl.
*G06F 21/32* (2013.01)
*G06K 7/10* (2006.01)
*G06K 7/14* (2006.01)
*G16Y 20/10* (2020.01)
*G16Y 40/30* (2020.01)

(52) U.S. Cl.
CPC ......... *G06F 21/32* (2013.01); *G06K 7/10722* (2013.01); *G06K 7/1417* (2013.01); *G16Y 20/10* (2020.01); *G16Y 40/30* (2020.01)

(58) Field of Classification Search
CPC ........ G06F 21/32; G16Y 20/10; G16Y 40/30; G06K 7/10722; G06K 7/1417
See application file for complete search history.

(56) References Cited

U.S. PATENT DOCUMENTS 10,826,961 B2 * 11/2020 Xie .................... H04N 21/8126
10,909,979 B1 * 2/2021 Chu ......................... G08B 3/10
(Continued)

FOREIGN PATENT DOCUMENTS

CN        104410883 A      3/2015
CN       1005045140 A     11/2015
(Continued)

OTHER PUBLICATIONS

Kono M, Ueki H, Umemura SI. Near-infrared finger vein patterns for personal identification. Applied Optics. Dec. 10, 2002;41(35):7429-36. (Year: 2002).*
(Continued)

*Primary Examiner* — Han Yang
(74) *Attorney, Agent, or Firm* — JEEN IP LAW, LLC

(57) ABSTRACT

The present disclosure relates to a device control method and system for identifying a target image and controlling an Internet of Things (IOT) device. The device control system can include: an information acquisition unit and a control unit communicating with the information acquisition unit. The information acquisition unit is configured to collect information of a user in a current environment and send the collected information of the user in the current environment to the control unit. The control unit is configured to analyze intent information of the user to use the device based on the collected information of the user in the current environment and control a corresponding device to perform a corresponding action based on the intent information of the user.

4 Claims, 2 Drawing Sheets collecting information of the user in the current environment ⎯ 410 analyzing the intent information of the user based on the collected information of the user in the current environment; and controlling the corresponding device to perform the corresponding action based on the intent information of the user ⎯ 420

(56) References Cited

U.S. PATENT DOCUMENTS

| | | | | |
|---|---|---|---|---|
| 2015/0330805 A1* | 11/2015 | Cho | ............... | H04W 4/02 |
| | | | | 701/428 |
| 2017/0011210 A1* | 1/2017 | Cheong | ............... | A61B 5/681 |
| 2017/0059197 A1* | 3/2017 | Goyal | ............... | G05D 23/1902 |
| 2017/0122655 A1* | 5/2017 | Yoon | ............... | G01K 13/20 |
| 2017/0329410 A1* | 11/2017 | Chiang | ............... | G06F 3/0304 |
| 2018/0336411 A1* | 11/2018 | Schuh | ............... | H04N 23/60 |
| 2019/0026716 A1* | 1/2019 | Anbukkarasu | ............... | G06Q 20/308 |
| 2019/0129176 A1* | 5/2019 | Endo | ............... | H04L 12/2803 |
| 2019/0304271 A1* | 10/2019 | Yu | ............... | G08B 13/19632 |
| 2020/0349952 A1* | 11/2020 | Lee | ............... | G10L 15/22 |
| 2021/0279475 A1* | 9/2021 | Tusch | ............... | H04L 63/0861 |

FOREIGN PATENT DOCUMENTS

| | | | |
|---|---|---|---|
| CN | 105867626 | A | 8/2016 |
| CN | 105872685 | A | 8/2016 |
| CN | 107239139 | A | 10/2017 |
| EP | 1924052 | A2 | 5/2008 |

OTHER PUBLICATIONS

De Buyser, E., et al. "Exploring the potential of combining smart glasses and consumer-grade EEG/EMG headsets for controlling IoT appliances in the smart home." (2016): 4-6. (Year: 2016).*
International Search Report issued in corresponding International application No. PCT/CN2018/086104, mailed Dec. 18, 2018.
Written Opinion of the International Searching Authority for No. PCT/CN2018/086104.

* cited by examiner

DEVICE CONTROL METHOD AND SYSTEM

CROSS REFERENCE TO RELATED APPLICATIONS

This application is a 371 of international PCT patent application PCT/CN2018/086104 filed on May 9, 2018.

TECHNICAL FIELD

The present disclosure generally relates to applications for Internet of Things (IoT) devices, and in particular, to a device control method and system thereof.

BACKGROUND

The rapid development of technology is quietly changing the lives of people. Because of the popularity of smart devices, the Internet of Things is becoming known to more and more people.

With the development of mobile Internet technology, more and more applications are installed on smart terminals with operating systems including Android developed by Google, iOS by Apple and Windows by Microsoft. Smart devices can be controlled by smart terminals using the applications of these systems. However, the interaction between the smart devices and the user and the mode of the interaction can be improved.

SUMMARY

In order to solve the above problems of poor interaction and single interaction mode in the prior art, a device control method and system are provided.

The present disclosure provides a device control system for identifying a target image and controlling an Internet of Things (IOT) device. The device control system can include: an information acquisition unit and a control unit communicating with the information acquisition unit. The information acquisition unit is configured to collect information of a user in a current environment and send the collected information of the user in the current environment to the control unit. The control unit is configured to analyze intent information of the user to use the device based on the collected information of the user in the current environment and control a corresponding device to perform a corresponding action based on the intent information of the user.

In some embodiments, the information acquisition unit can include an environmental acquisition module, an identity authentication acquisition module, a user analysis module and a first screen module.

The environmental acquisition module is configured to collect information of the environment and information of the device.

The identity authentication acquisition module is configured to collect identity characteristics of the user.

The user analysis module is configured to identify the user based on the identity characteristics of the user and identify characteristics of the intent information of the user The first screen module is configured to output the image.

The control unit is respectively connected to the environmental acquisition module, the identity authentication acquisition module and the user analysis module. The control unit comprises preset operation instructions corresponding to preset characteristics of the intent information, and the control unit is configured to analyze the information of the environment collected by the environmental acquisition module to locate the user's location, compare the characteristics of the intent information of the user with the preset characteristics of the intent information to send corresponding operation instructions to the corresponding device, verify the identity characteristics of the user and analyze whether the user has an authority to control the device.

In some embodiments, the information acquisition unit can also include a first wireless module and a first screen module. The first wireless module is configured to connect to the IOT device, and the first screen module is configured to output the image.

In some embodiments, the identity authentication acquisition module can include an infrared camera configured to acquire images of finger veins and joints of the user.

In some embodiments, the device control system can also include an output unit. The output unit is communicated with the information acquisition unit and the control unit respectively, and the output unit can include an audio module, a second screen module and an output control module.

The audio module is configured to acquire audio and output audio.

The second screen module is configured to output the image.

The output control module is respectively connected to the audio module, the second screen module and a second wireless module, and the output control module is configured to generate the operating instructions to control the device.

In some embodiments, when the information acquisition unit and the output unit are connected, the image is displayed by the second screen module instead of by the first screen module, and the first screen module does not display the image.

In some embodiments, the device control system is connected to a server, and the server is configured to process data information of the device control system. The device control system is configured to control a device connected to the server via the server.

The present disclosure further provides a device control method applied to the device control system. The device control method can include the following steps:

collecting information of the user in the current environment;

analyzing the intent information of the user based on the collected information of the user in the current environment; and controlling the corresponding device to perform the corresponding action based on the intent information of the user.

In some embodiments, the device control method can also include:

collecting the identity characteristics of the user and verifying whether the identity characteristics of the user is consistent with preset identity characteristics of the user of the control unit;

if yes, the device control system will respond to input commands of the user;

if no, the device control system will not respond to the input commands of the user.

In some embodiments, the step of analyzing the intent information of the user based on the collected information of the user in the current environment and controlling the corresponding device to perform the corresponding action based on the intent information of the user can also include:

connecting the device with the device control system and/or connecting the device with a server, identifying the characteristics of the intent information of the user to control the device and/or determining a relationship between spatial location of the user and spatial location of the device to control the device; and acquiring a target image, recognizing a target from the target image by the device control system and/or server, and launching software in the device control system corresponding to the target.

The device control method and system of the present embodiment has many advantages, such as the user can control the device through the device control system, and the device control system can acquire the information of the device and a relationship between the location of the device and the location of the user, and the device control system can identify the characteristics of the intent information of the user to control the device, resulting in making the interaction between the user and the device more convenient and quicker.

DETAILED DESCRIPTION

The present disclosure will be further described in detail below with reference to the drawings and specific embodiments, in order to better understand the objective, the technical solution and the advantage of the present disclosure. The present disclosure may be implemented in many different forms and the specific embodiments described herein are merely illustrative and are not intended to limit the scope of the disclosure. Specially, the purpose of providing the specific embodiments is to provide a more thorough and comprehensive understanding of the present disclosure.

Unless otherwise defined, all technical and scientific terms used herein have the same meaning as a skilled person in the art would understand. The terminology used in the description of the present disclosure is for the purpose of describing particular embodiments and is not intended to limit the disclosure.

Figure 1:
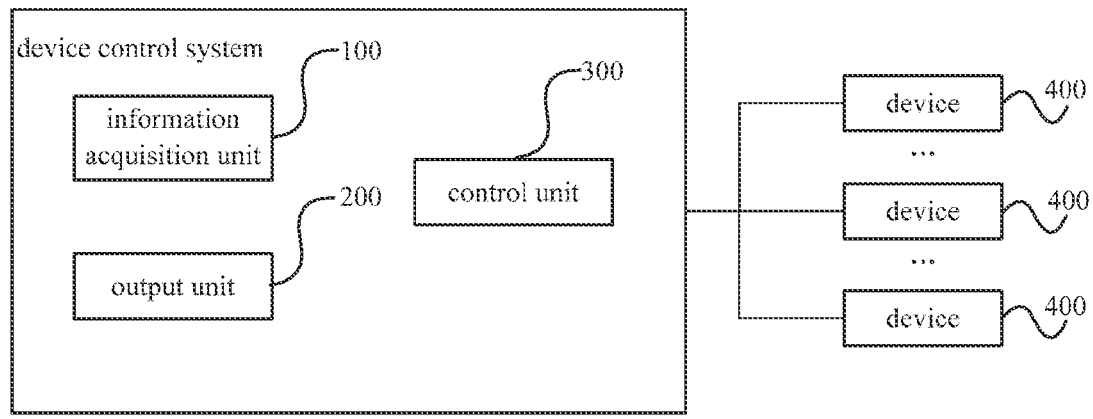
FIG. 1 is a schematic view of a device control system according to one embodiment of the present disclosure.

Referring to FIG. 1, a device control system for controlling an TOT device 400 is provided. The device 400 can be, but is not limited to, a vehicle, a household appliance, a piece of furniture, an office supply, an electronic device, or the like. The device control system can include an information acquisition unit 100 and a control unit 300 in communication with the information acquisition unit 100. The information acquisition unit 100 can be configured to collect information of a user in a current environment and send the collected information of the user in the current environment to the control unit 300. The control unit 300 can be configured to analyze intent information of the user to use the device based on the collected information of the user in the current environment, and control the corresponding device 400 to perform a corresponding action based on the intent information of the user.

The device control system can include an information acquisition unit 100, an output unit 200, and a control unit 300. The information acquisition unit 100, the output unit 200, and the control unit 300 can communicate with each other. The device control system can be connected to a server, and the server can be configured to process data information of the device control system.

The device control system can communicate with the device 400 and be capable of detecting, identifying, and controlling the device 400 based on predetermined trigger conditions. The device control system and the device 400 can be connected via an internal closed network or via the Internet.

The device control system can be connected to a smart terminal. The smart terminal can be capable of controlling the device 400 connected to the device control system. The smart terminal can include a mobile phone, a tablet, a computer, or other smart device. In one embodiment, the smart terminal can be a mobile phone.

Figure 2:
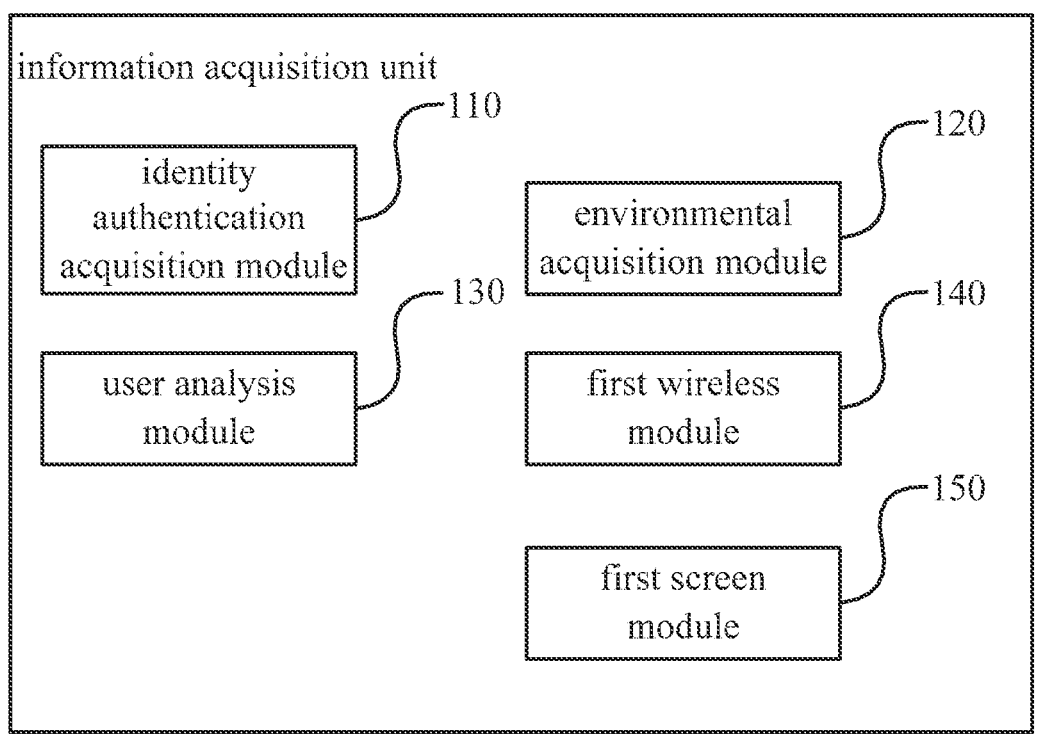
FIG. 2 is a schematic view of an information acquisition unit of FIG. 1.

Referring to FIG. 2, the information acquisition unit 100 can include an environmental acquisition module 120, an identity authentication acquisition module 110, a user analysis module 130, a first wireless module 140, and a first screen module 150. The environmental acquisition module 120 can be configured to collect information of the environment and information of the device 400. The identity authentication acquisition module 110 can be configured to collect identity characteristics information of the user. The user analysis module 130 can be configured to identify the user based on the identity characteristics information of the user and identify characteristics of the intent information of the user. The first screen module 150 can be configured to output the image. And the first wireless module 140 can be configured to connect to the device 400.

The control unit 300 can be communicated with each module of the information acquisition unit 100. The control unit 300 can include preset operation instructions corresponding to preset characteristics of the intent information. The control unit 300 can be configured to analyze the information of the environment collected by the environmental acquisition module 120 to locate the location and direction of the user, compare characteristics of the intent information of the user with the preset characteristics of the intent information to send corresponding operation instructions to the device 400, verify the identity characteristics information of the user and analyze whether the user has an authority to control the device.

The identity authentication acquisition module 110 can send the collected identity characteristics information of the user to the control unit 300. The control unit 300 can include preset information of identity characteristics, and the control unit 300 can compare the identity characteristics information of the user collected by the identity authentication acquisition module 110 and the preset information of identity characteristics of the control unit 300 to verify if they are consistent. If the identity characteristics information of the user is not consistent with the preset information of identity characteristics, the device control system will not respond to input commands of the user. If the identity characteristics information of the user is consistent with the preset information of identity characteristics, the device control system will respond to the input commands of the user. In one embodiment, the identity authentication acquisition module 110 can include an infrared camera configured to acquire images of finger veins and joints of the user. It can be understood that the identity authentication acquisition module 110 can also be an iris reader, a fingerprint reader, a face recognition and other biometric identity authentication devices.

The control unit 300 can include a vision processor. The control unit 300 can receive the information of the device 400 and the information of the environment collected by the environmental acquisition module 120, analyze the information of the device 400 and the information of the environment by the vision processor in order to identify the target, and identify a fixed identifier from the information of the environment to locate a location of the user. The fixed identifier can include household electrical equipments, furniture, road signs, signal lights, trees, buildings or other stationary objects.

In one embodiment, the control unit 300 can establish a spatial rectangular coordinate system based on the information of the environment and the information of the device 400 collected by the environmental acquisition module 120. The spatial rectangular coordinate system can simulate the information of the device 400 and the fixed identifier in the information of the environment and set corresponding parameters, thereby locating the location of the user. There can be six degrees of freedom attitude for the user in the spatial rectangular coordinate system. The control unit 300 can analyze the information of the environment, locate a relationship between the location of the user and the location of the fixed identifier in the six degrees of freedom attitude, and determine a relationship between the location of the device 400 and the location of the user. The control unit 300 can control the action of the device 400 according to the relationship between the location of the device 400 and the location of the user.

The user analysis module 130 can send the characteristics of the intent information of the user to the control unit 300, which can include the preset operation instructions corresponding to the preset characteristics of the intent information. In one embodiment, the characteristics of the intent information of the user can include gesture, spatial attitude information of the wrist and/or binocular focus information of the user. The control unit 300 can analyze the gesture, the spatial attitude information of the wrist and/or binocular focus information of the user and compare above collected information with preset gesture, spatial attitude information of the wrist and/or binocular focus information of the user of the control unit 300 to verify if they are consistent. If the gesture is consistent with the preset gesture, the spatial attitude information of the wrist is consistent with the preset spatial attitude information of the wrist, and/or the binocular focus information of the user is consistent with the preset binocular focus information of the user, the corresponding operation instructions will be sent to the device 400. If the gesture is not consistent with the preset gesture, the spatial attitude information of the wrist is not consistent with the preset spatial attitude information of the wrist, and/or the binocular focus information of the user is not consistent with the preset binocular focus information of the user, no operation instructions will be sent to the device 400, prompting the user that the gesture has not been recognized. It can be understood that the characteristics of the intent information of the user can also be a manifestation of binocular focus information of the user, a limb movement, a voice password, or other characteristics of the intent information of the user, provided only that the control unit 300 can be able to recognize that the characteristics of the intent information of the user match the preset operation instructions. It can be understood that a prompting method can also be a vibration prompt, a voice prompt, a light prompt, a text prompt, an image prompt or other prompting method.

Figure 3:
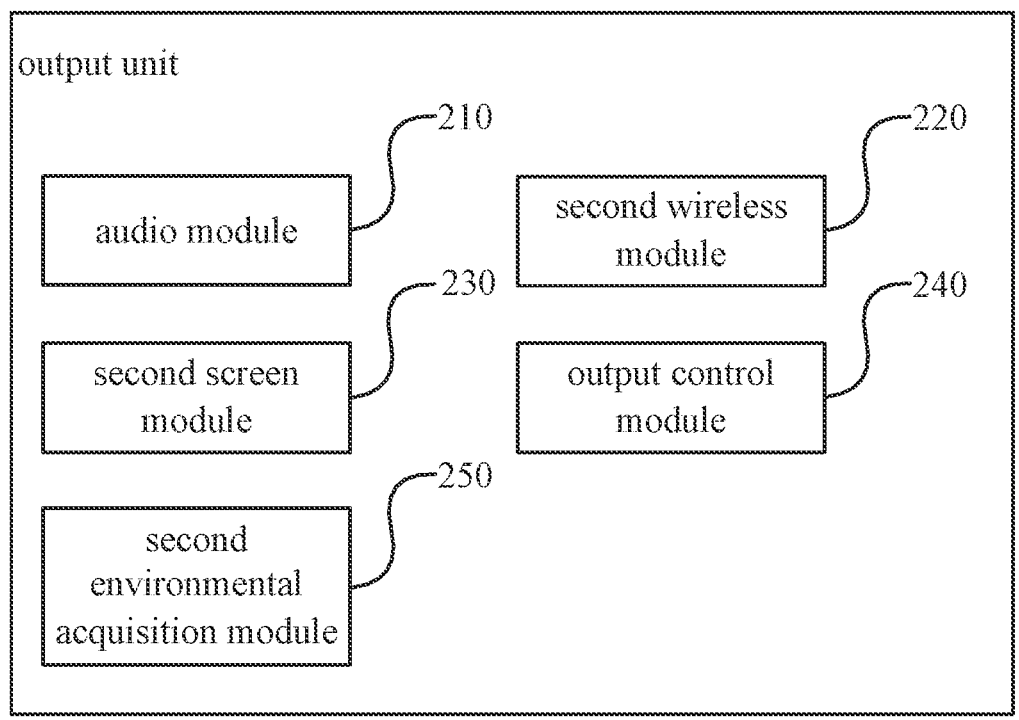
FIG. 3 is a schematic view of an output unit of FIG. 1.

Referring to FIG. 3, the output unit 200 can include: an audio module 210 for acquiring audio and outputting audio; a second screen module 230 for outputting an image; and an output control module 240 respectively connected to the second screen module 230 and the audio module 210 for generating the operation instructions to control the device 400. In one embodiment, the output unit 200 can also include a second wireless module 220 configured for connecting to the device 400 of the IoT.

The output unit 200 can also include a second environmental acquisition module 250 configured for sending collected compensation information of the environment to the control unit 300. The control unit 300 can analyze the compensation information of the environment and compare the compensation information of the environment with the information of the environment collected by the information acquisition unit, thereby locating the user's location more accurately.

When the information acquisition unit 100 and the output unit 200 are connected, the image is displayed by the second screen module 230 instead of by the first screen module 150. That is, the first screen module 150 will not display the image.

The audio module 210 can also recognize the voice of the user, send the voice of the user to the output control module 240. The output control module 240 can include the preset operation instructions corresponding to preset voice, analyze the voice of the user, and compare the voice of the user with the preset voice of the output control module 240 to verify if they are consistent. If the voice of the user is consistent with the preset voice, the device control system will respond to the input commands of the user. If the voice of the user is not consistent with the preset voice, the device control system will not respond to the input commands of the user, prompting the user that the voice has not been recognized. It can be understood that the prompting method can also be a vibration prompt, a voice prompt, a light prompt, a text prompt, an image prompt, or other prompting method. The audio module 210 and the user analysis module 130 of the information acquisition unit 100 can be used in combination to achieve the fastest input results.

The following are several modes of controlling the device control system described.

In a first mode, when the user wears the device control system near the device 400, the information of the image obtained by the environmental acquisition module 120 is analyzed by the control unit 300 to obtain the data of the six degrees of freedom attitude of the user in the spatial rectangular coordinate system, i.e., the location data of the user. Thus, the device control system can obtain data of the distance, direction, etc. of the user relative to the device 400, and automatically issue a command to control the device 400. For example, the device control system can be connected to a smart toilet, and when the user is near the smart toilet, the device control system will send an opening command to the smart toilet, and a toilet lid of the smart toilet will open. When the user moves away from the smart toilet, the device control system can send a closing command to the smart toilet, and the toilet lid of the smart toilet will close and the smart toilet will flush. In another embodiment, the device control system is connected to a smart desk lamp, and when the user is near the desk, the device control system can send an on command to the smart desk lamp, and the smart desk lamp will turn on. When the user moves away from the desk, the device control system can send an off command to the smart desk lamp, and the smart desk lamp will turn off.

In a second mode, the user can use the device control system to determine the device 400 to be controlled, and control the device 400. For example, the device control system can be connected to a plurality of devices, and a specific gesture of the user indicates that the user intends to control a smart TV set of the plurality of devices. The device control system can analyze the specific gesture of the user, control the smart TV set and display a control menu of the smart TV set at the output unit 200 for the user to select. And the user can select the control menu by means of a corresponding gesture and/or by means of touching screen.

In a third mode, the user can use the device control system to acquire a target image, identify the target image by the device control system and/or a server, and display the control menu on the output unit 200. In the process of identifying the target image, the identification of the target image can be made more accurate by the fixed marks in the information of the environment collected by the information acquisition unit 100. For example, the user can control the device control system to point to the courier cabinet, then the control unit 300 can analyze a target image as the courier cabinet, and locate the location of the courier cabinet according to the fixed identifiers on/around the courier cabinet at the same time. The device control system can open software application (APP in short) corresponding to the courier cabinet. The information acquisition unit 100 can submit identity authentication information, automatically send a pickup code, and open the courier cabinet door. For example, the user can specify the device control system to identify the vehicle, and when the device control system and/or the server successfully identifies the vehicle, display a control menu in the output unit 200 for the user to choose, and the control menu can include the identifying vehicle model information and different search information present according to different vehicle information. For example, if the vehicle is identified to be a bus, the device control system can open a route map corresponding to the bus. If the vehicle is identified to be a car, the device control system can open taxi software application (APP in short), and the device control system can also analyze further images of the vehicle parts, vehicle routes or other relevant vehicle information.

In a fourth mode, the user can use the device control system to acquire a target image which includes software information, such as a QR code and/or text description information. The control unit 300 can process the QR code and/or text description information, and enable a corresponding software according to the processed QR code and/or text description information. The control unit 300 can enable the corresponding software by identifying the Chinese character "Zhi" in the QR code of Alipay, and the Chinese character "Wei" in the QR code of WeChat. For example, the 2D code merchant usually prints text description information around the 2D code to explain the 2D code. The control unit 300 can enable the corresponding software based on the text description information after processing.

During the use of the third mode, the information collection unit 100 can simultaneously collect the identity characteristics information of the user and directly verify the identity characteristics information of the user into the taxi-hailing software application (APP in short) without additional operation of the user. It can be understood that the taxi-hailing software application (APP in short) can also be other software application (APP in short) that requires identity information verification. Furthermore, the identity characteristics information of the user can be authenticated by a device connected to the device control system, and if the authentication passes, the user can use the device, and if the authentication fails, the user can not use the device.

Figure 4:
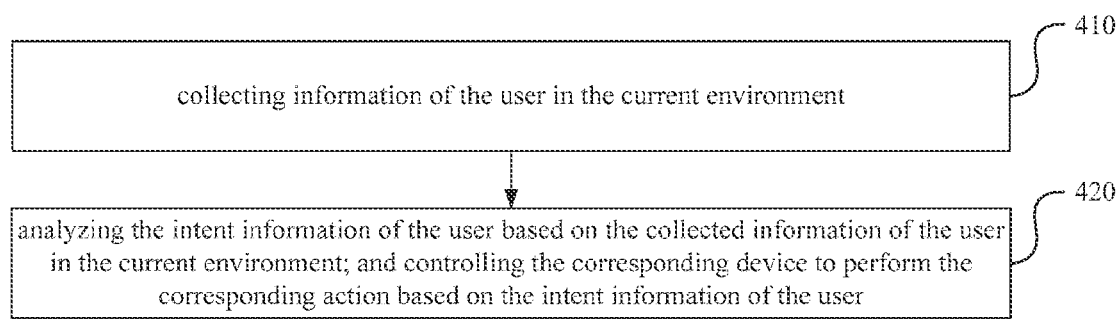
FIG. 4 is a flowchart view of a device control method according to another embodiment of the present disclosure.

Referring to FIG. 4, a device control method is further provided.

The device control method applied to the device control system, and the device control method can include the following steps:

Step 410, collecting information of the user in the current environment; and Step 420, analyzing the intent information of the user based on the collected information of the user in the current environment; and controlling the corresponding device to perform the corresponding action based on the intent information of the user.

The device control method can also include: collecting the identity characteristics information of the user and verifying whether the identity characteristics information of the user is consistent with preset information of identity characteristics of the user of the control unit; if the identity characteristics information of the user is consistent with the preset information of identity characteristics, the device control system will respond to input commands of the user; if the identity characteristics information of the user is not consistent with the preset information of identity characteristics, the device control system will not respond to the input commands of the user.

The step of analyzing the intent information of the user to use the device based on the collected information of the user in the current environment and controlling the corresponding device to perform the corresponding action based on the intent information of the user can also include: connecting the device with the device control system and/or connecting the device with a server, identifying the characteristics of the intent information of the user to control the device and/or determining a relationship between the spatial location of the user and the spatial location of the device to control the device; and acquiring a target image, recognizing a target from the target image by the device control system and/or server, and launching software in the device control system corresponding to the target. If the software requires authentication, the characteristics of the intent information of the user are collected by the information acquisition unit for authentication. If the software does not require authentication, the software is launched directly.

In the device control method, when the user uses the device control system, the device control system can verify that whether the identity profile information of the user is consistent with the preset identity profile information of the user in the database. If the identity profile information of the user is consistent with the preset identity profile information of the user, the user is allowed to use the device control system. If the identity profile information of the user is not consistent with the preset identity profile information of the user, the user is prohibited from controlling the device 400. The information acquisition unit can collect information of the user in the current environment and send the information of the user to the control unit. The control unit can analyze the intent information of the user to use the device based on the information of the user and control the corresponding device according to the intent information to perform the corresponding action. The information acquisition unit 100 can collect the information of the environment, analyze the information of the environment to locate the location of the user. The user connects to the device 400 through the device control system, and controls the device 400 by gesture and voice. The device 400 is controlled by determining the relationship between the location of the user and the location of the device 400, and when the information acquisition unit 100 locates the location of the user, if the distance and direction of the location of the user relative to the device 400 reach a preset value respectively, the device 400 can be controlled to perform. The information acquisition unit 100 can obtain a target image, identify the target from the target image, and open software application (APP in short) corresponding to the target. The corresponding software application (APP in short) can include software of the device control system or software of a server configured for controlling the device.

The device control method and system of the present embodiment has many advantages. The user can control the device through the device control system, and the device control system can acquire the information of the device and a relationship between the location of the device and the location of the user, and the device control system can identify the characteristics of the intent information of the user to control the device, making the interaction between the user and the device more convenient and quicker.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

I claim:

1. A device control method, applied to a device control system, wherein the device control system is configured for identifying a target image and controlling an Internet of Things (IOT) device, the device control system is a wearable system, and the device control method comprises the following steps:

acquiring the target image, collecting information of a user in the current environment, identifying the IOT device in the target image, acquiring a mark in the current environment based on the target, and determining an IOT device that needs to be controlled based on the mark; and issuing a command according to the information of the user to control the IOT device that needs to be controlled;

issuing the command according to the information of the user to control the IOT device that needs to be controlled further comprises:

identifying characteristics of intent information of the user according to the information of the user, and issuing the command according to the characteristics of intent information of the user to control the IOT device that needs to be controlled, wherein the characteristics of intent information of the user comprise a gesture, spatial attitude information of a wrist, or a limb movement.

2. The device control method of claim 1, further comprising:

connecting the IOT device that needs to be controlled with the device control system and/or connecting the IOT device that needs to be controlled with a server, identifying the characteristics of intent information of the user to control the IOT device that needs to be controlled and/or determining a relationship between a spatial location of the user and a spatial location of the IOT device to control the IOT device that needs to be controlled; and recognizing a target from the target image by the device control system and/or the server, and launching software in the device control system corresponding to the target.

3. The device control method of claim 1, wherein the method further comprises:

collecting identity characteristics of the user and verifying whether the identity characteristics of the user is consistent with preset identity characteristics of the user, wherein, if yes, the device control system will respond to input commands of the user;

if no, the device control system will not respond to the input commands of the user.

4. The device control method of claim 3, wherein collecting identity characteristics of the user further comprises:

acquiring images of finger veins and joints of the user by an infrared camera.

* * * * *